(12) United States Patent
MacMurdo (10) Patent No.: US 11,334,851 B1
(45) Date of Patent: May 17, 2022

(54) EXTENDING AVAILABILITY OF BUSINESS DATE DRIVEN APPLICATIONS

(75) Inventor: Paul Isman MacMurdo, Cranberry Township, PA (US)

(73) Assignee: The PNC Financial Services Group, Inc., Pittsburgh, PA (US)

( * ) Notice: Subject to any disclaimer, the term of this patent is extended or adjusted under 35 U.S.C. 154(b) by 1704 days.

(21) Appl. No.: 11/804,671

(22) Filed: May 18, 2007

(51) Int. Cl.
*G06Q 10/10* (2012.01)

(52) U.S. Cl.
CPC .................................. *G06Q 10/109* (2013.01)

(58) Field of Classification Search
CPC .............. G06Q 10/06; G06Q 10/06315; G06Q 10/109; G06Q 10/063; G06Q 10/107; G06Q 10/1093; G04G 99/00
USPC ................. 700/99; 705/37; 368/29; 713/189
See application file for complete search history.

(56) References Cited

U.S. PATENT DOCUMENTS

| | | | | |
|---|---|---|---|---|
| 3,974,362 | A * | 8/1976 | Willmann ................. | G07C 1/02 377/20 |
| 5,691,525 | A * | 11/1997 | Aoki ....................... | G06Q 20/04 235/379 |
| 5,719,826 | A * | 2/1998 | Lips ........................ | G04G 99/00 368/29 |
| 5,983,200 | A | 11/1999 | Slotznick | |
| 6,044,219 | A | 3/2000 | Lips | |
| 6,044,371 | A * | 3/2000 | Person et al. | |
| 6,108,640 | A * | 8/2000 | Slotznick ............... | G06Q 30/06 705/7.18 |
| 6,236,982 | B1 * | 5/2001 | Mahajan et al. ................. | 706/45 |
| 6,262,725 | B1 * | 7/2001 | Hetherington et al. ...... | 715/733 |
| 6,275,810 | B1 | 8/2001 | Hetherington et al. | |
| 6,983,188 | B2 * | 1/2006 | Loughran et al. .............. | 700/99 |
| 7,349,920 | B1 * | 3/2008 | Feinberg et al. | |
| 7,624,052 | B1 * | 11/2009 | Seaman .................. | G06Q 40/00 705/35 |
| 2003/0147309 | A1 * | 8/2003 | Weisberg ................. | G09D 3/12 368/29 |
| 2004/0133876 | A1 * | 7/2004 | Sproule ................ | G06Q 10/067 717/105 |
| 2004/0210608 | A1 * | 10/2004 | Lee et al. ...................... | 707/204 |

(Continued)

FOREIGN PATENT DOCUMENTS

WO    WO-9507500 A1 *  3/1995  ........... G04G 15/006

OTHER PUBLICATIONS

"Dotnetjunkies™ Are you a professional?" printed from http://www.dotnetiunkies.com/Article/9B09AFEB-F260-4326-AF9F-983A452FAB76.dcik, Internet site, accessed on Mar. 21, 2007, 3 pages.

(Continued)

*Primary Examiner* — Shelby A Turner
(74) *Attorney, Agent, or Firm* — Buchanan Ingersoll & Rooney PC (57) ABSTRACT

A method is provided for executing a business date driven application, such as a financial system or a banking application, in an open computing system environment. The method may include accessing a calendar control module to determine an operational mode of the application. The calendar control module is based at least in part on a Julian calendar and may include a Julian calendar day of year field, an application start command field, an application restart command field, and/or a business date indicator field. The method includes executing the business date driven application in accordance with the determined operational mode.

12 Claims, 7 Drawing Sheets

(56) References Cited

U.S. PATENT DOCUMENTS

| | | | |
|---|---|---|---|
| 2005/0047279 A1* | 3/2005 | Ito | G04G 15/006 |
| | | | 368/10 |
| 2005/0102287 A1* | 5/2005 | Poole | G06Q 40/04 |
| 2006/0053304 A1* | 3/2006 | Fries | G06F 11/1451 |
| | | | 713/189 |
| 2006/0210034 A1* | 9/2006 | Beadle | G06Q 10/107 |
| | | | 379/88.22 |
| 2006/0224491 A1* | 10/2006 | Pinkava | 705/37 |
| 2007/0203958 A1* | 8/2007 | Suzuki | G06F 11/2097 |

OTHER PUBLICATIONS

"COSbatch—frequently asked questions—FAQs," printed from http://www.cosbatch.com/faq.htm. Internet site, accessed on Mar. 21, 2007, 4 pages.

* cited by examiner

EXTENDING AVAILABILITY OF BUSINESS DATE DRIVEN APPLICATIONS

FIELD OF THE INVENTION

Embodiments of the invention generally relate to providing enhanced availability to computer-implemented applications such as financial systems, banking applications, and many other kinds of business date driven applications.

BACKGROUND

For many industries, maintaining a suitable level of availability of computer systems can be critical to operations or commercial activities that depend on the advantages and efficiencies of computer processing power. In particular, the availability of business date driven applications often depends on effectively determining when a given day is a business day or non-business day (e.g., holiday). For financial applications and banking applications, for example, the capability to make certain features and functions available (or unavailable) on business days, non-business days, or both can have a significant impact on the commercial success of a financial institution employing such applications.

There is an unsatisfied need, however, for more effective and efficient tools and processes that can enhance the availability of business date driven applications and their benefits. For example, many applications (including those employed in open system computing environments) do not have the capability to deal with holidays and other kinds of non-business days. Many industries require the ability to make certain aspects of business date driven applications available when needed or unavailable at appropriate times. Therefore, improved applications that can discriminate between and among different business days and non-business days are needed.

BRIEF DESCRIPTION OF THE FIGURES

The utility of the embodiments of the invention will be readily appreciated and understood from consideration of the following description of the embodiments of the invention when viewed in connection with the accompanying drawings, wherein.

DESCRIPTION

As applied herein, the term "open system computing environment" describes a computing environment having components (e.g., software or other sets of instructions) derived from a number of different sources and not reliant upon any single source. For example, trade-designated "UNIX" or "Linux" operating systems may be part of an "open system computing environment" as employed in accordance with embodiments of the invention described herein.

The term "business date driven application" includes any application, computer system, or set of instructions capable of causing a programmable apparatus (e.g., a processor) to execute one or more actions, functions, tasks or operations in an open computing system environment. Examples of "business date driven applications" include financial applications, banking systems, computer-based task or job scheduling applications, inventory control applications, and/or a variety of other applications that execute calendar-based actions, functions, tasks or operations. In certain embodiments, "business date driven application" may include any application that needs to discriminate between business dates and non-business dates to perform a given action, function, task, or operation. Examples of non-business dates include, without limitation, holidays, federal holidays, banking holidays, United States holidays, and international holidays.

In various embodiments, the invention offers automated, Julian calendar based methods and systems for extending the availability or accessibility of various kinds of business date driven applications. The invention provides the opportunity for long-term scheduling granularity typically not available in conventional open system applications and is generic to open systems application controls. In operation, embodiments of the invention offer nearly 24-hour, 5-day availability for business date driven applications. In certain embodiments, applications can be started, restarted, not started or restarted, or recovered, depending on user requirements. Embodiments of the invention also account for holiday business day support, including the capability to provide partial functionality on a holiday with a scheduled return to full functionality on a future business day.

If an application employs calendar based actions to drive functionality rather than simply performing tasks at fixed points in time, then a calendar of actions, based on day-of-year information, can be useful or necessary as a reference for the application to determine its next action or task. In various embodiments, the invention uses a calendar of predefined actions, based on the day of the year, to determine what action to take on a specific calendar day. For example, embodiments of the invention may function in association with a banking type of business date driven application that relies on the definition of a calendar business day to execute scheduled jobs, process transactions (e.g., "SWIFT" transactions or Federal Reserve Bank transactions), record account credits or debits, execute fund transfers, or many other financially relevant functions or tasks. For the banking application, one or more of the following can be determined, for example: the correct business day for a specific day of the year; the next appropriate business day for the application to operate if the current day is a holiday; whether to start the application on a new business day following a non-business day such as a weekend, holiday, or other non-business date; and/or, when to shut down the application if the next day is not a business day, or when to not start the application if the current day is not a business day.

The inventor has recognized that typical open system computing environments do not have an adequate facility for determining holidays, for example, and that business date driven applications that require knowledge of holidays would benefit from such a capability. The lack of a control calendar module enabling the definition of application start, restart, shutdown, and/or recovery options on specific business and non-business dates has historically restrained efforts to achieve an automated approach to extending application availability. If the application relies on the concept of business day (which can be defined as an accounting period) and correct business days must be repeatedly defined by the user, a method for specifying the correct business day would be advantageous to avoid or limit human intervention typically required to start, restart, and shutdown the application.

Embodiments of the invention may use a Julian calendar-based control module, for example, in connection with standard open systems chronological scheduling processes, to define multiple start and restart options for a financial or banking application. Application down time can be minimized as the determination of whether to start or restart the application is made in accordance with the calendar control module. The calendar module may also define or specify appropriate business day declarations for holiday availability. In various embodiments, the invention provides methods that enable enhanced automation of application startup, shutdown, restart, and recovery to provide maximum availability, including availability on certain designated holidays and other non-business days. On such holidays and non-business days, the application can operate in a holiday operational mode, wherein the application does not need to be in a fully functional, normal operational mode. The holiday operational mode may limit or reduce application functionality or features in comparison to normal operational mode, while potentially also scheduling restoration of full functionality for a subsequent business day.

Figure 1:
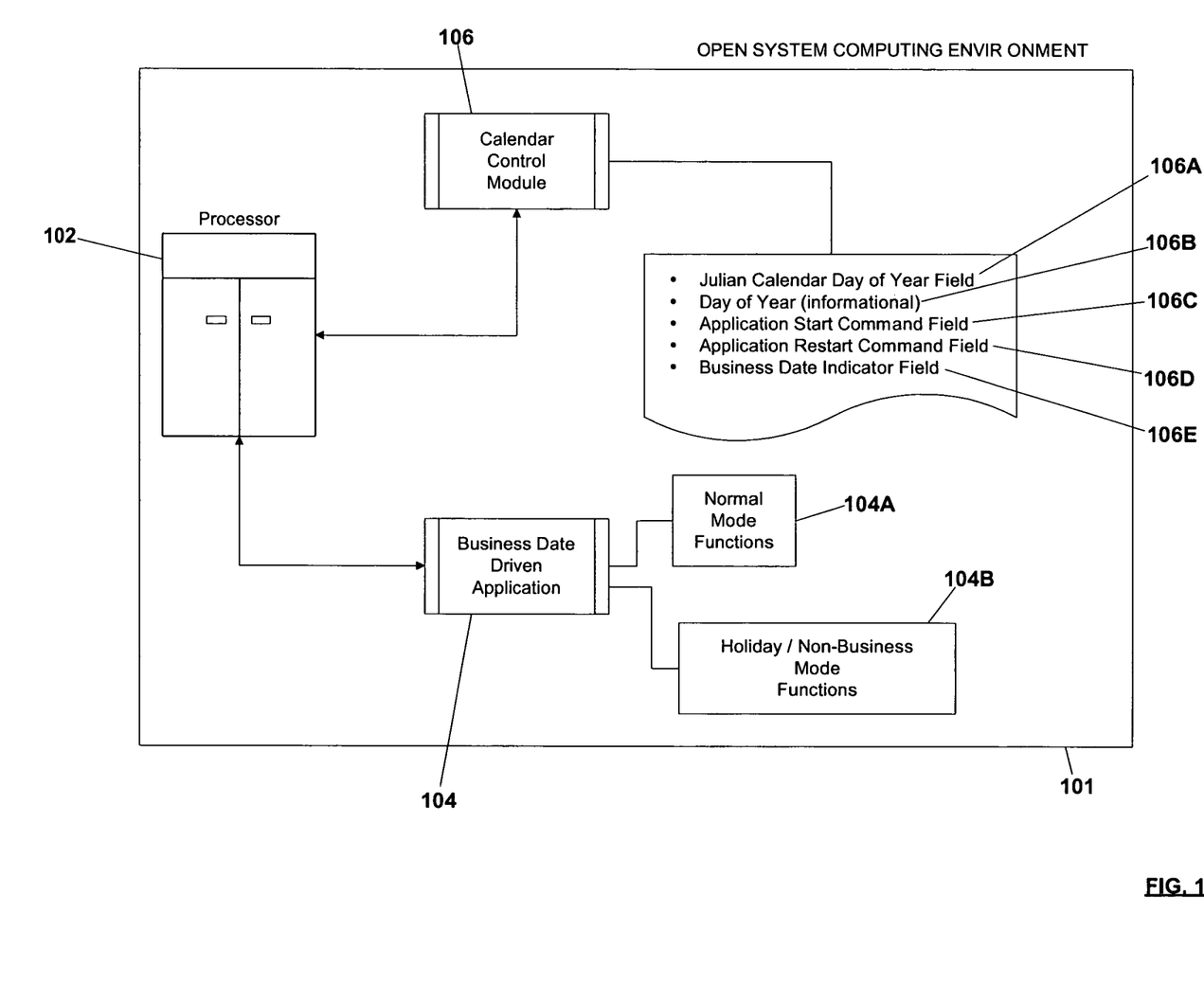
FIG. 1 includes a schematic of an open system computing environment including an example of a calendar control module configured for operation in accordance with embodiments of the invention.
Figure 2:
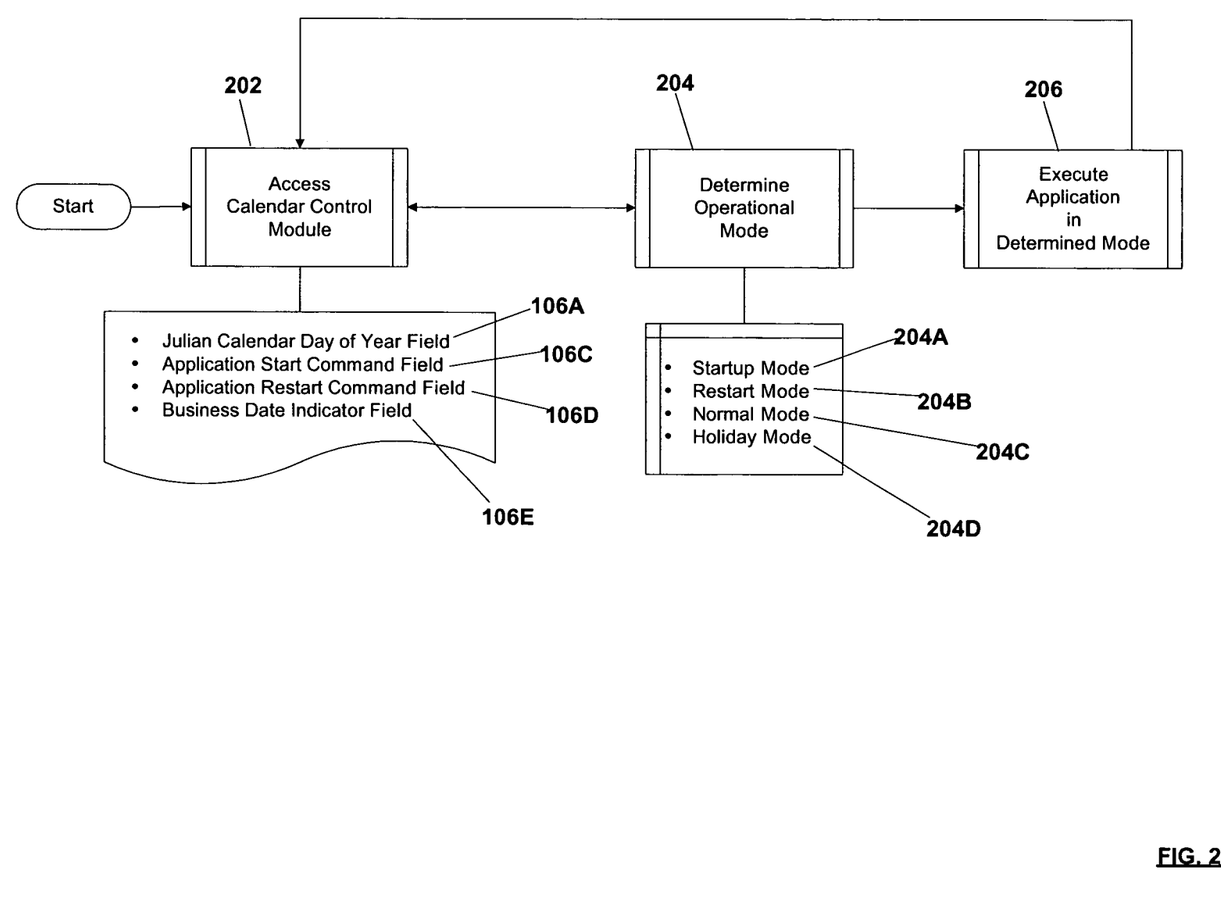
FIG. 2 includes a process flow diagram illustrating a method for executing a business date driven application in various operational modes in accordance with embodiments of the invention.

With reference to FIGS. 1 and 2, a schematic of an open system computing environment 101 is shown including a processor 102 configured to access and execute operations in association with one or more different kinds of business date driven applications 104, such as financial applications or banking applications. The processor 102 may be a computer system or server, for example, configured to execute one or more kinds of scheduled jobs, cron jobs or commands executed by a cron daemon at scheduled intervals in association with execution of the server. The application 104 may have a set of normal mode functions 104A which it executes or performs on a business day, for example, and which represent full functionality for the application 104. In certain embodiments, the application 104 may have a set of holiday or non-business mode functions 104B which it executes on non-business days, for example. The set of holiday or non-business mode functions 104B may represent a subset of the normal mode functions 104A, or otherwise may be comparatively less in volume or complexity in comparison to the normal mode functions 104A.

At step 202, in operation of the processor 102 within the open system computing environment 101, a calendar control module 106 may be accessed to obtain calendar-based date information and operational mode data for the application 104. The calendar control module 106 may include a plurality of fields that contain such information. Examples of fields contained in the calendar control module 106 include the following: a Julian calendar day of year field 106A; a day of year informational field 106B; an application start command field 106C; an application restart command field 106D; and/or, a business date indicator field 106E. The Julian date field 106A may be formatted as an integer that represents a day of the year on a Julian-based calendar (e.g., "1" for Jan. 1, 2007). The day of year field 106B may be primarily informational and may include the text representation of the value in the Julian date field 106A (e.g., "Jan. 1, 2007" if "1" is in the Julian date field 106A).

The application start command field 106C may include values related to the operational mode of the application 104 at the start of a given day (e.g., early morning such as at 3:00 a.m.). Examples of values that may be included in the start command field 106C include instructions such as "start_app", "no", "holiday", or "recover". In operation, the processor 102 may check the calendar control module 106 (in accordance with a scheduled job, for example) at the start of a given day at step 202. The application 104 may be executed at step 206 in accordance with the operational mode determined at step 204. If "start_app" is found in the field 106C, then the processor 102 will determine and trigger a start or startup mode 204A as the operational mode of the application 104 at step 204. If "no" is found in the field 106C, then the application 104 will not be started. If "holiday" is found in the field 106C, such as in the event of a Monday holiday occurrence, for example, then the application 104 can be started in holiday mode 204D with features and functions selected for a non-business day operation versus normal mode 204C of operation. If "recover" is found in field 106C, this instructs the processor 102 to restart the application 104, typically after a holiday or non-business date (e.g., a Monday restart after a Friday holiday).

As noted above, the holiday mode 204D may represent less functionality for the application 104 than the normal mode 204C, with a planned restoration of the full functionality of normal mode 204C once the holiday or non-business date has passed. For example, certain institutions may use an application monitor that checks the health of various components in the open system computing environment 101 in the normal mode 204C of operation. In contrast, such an application monitor may be configured for limited or no operation during holiday mode 204D. In another example, archiving or erasing application 104 transaction history records may be limited or not performed in holiday mode 204. In addition, certain communication connections exchanging information with the application 104 may be disabled in holiday mode 204D in view of reduced bandwidth requirements, for example.

The business date indicator field 106E may be accessed in association with the command fields 106C, 106D to determine a specific date associated with the holiday or non-business date. The format of values contained in the business date indicator field 106E may be in "YYMMDD" date format, for example, or any other suitable format.

The application restart command field 106D may include values related to the operational mode of the application 104 at the end of a given day (e.g., late evening such as at 10:30 p.m.). Examples of values that may be included in the restart command field 106D include instructions such as "restart_app", "no", or "holiday", or "recover". In operation, the processor 102 may check the calendar control module 106 (in accordance with a scheduled job, for example) at the end of a given day at step 202. The application 104 may then be executed at step 206 in accordance with the operational mode determined at step 204. If "restart_app" is found in the field 106D, then the processor 102 will determine a restart mode 204B as the operational mode of the application 104 at step 204, which may be configured to restart the application 104 at step 206 on the next business date. If "no" is found in the field 106D, then the application 104 will not be restarted (e.g., end of day Friday). If "holiday" is found in the field 106D, such as in the event of a Monday holiday occurrence, then the application 104 can be restarted in a holiday mode 204D with features and functions selected for a non-business day operation versus a normal mode 204C of operation. The business date indicator field 106E may be accessed in association with the start command field 106D to determine which specific date is associated with the holiday or non-business date. In various embodiments, exemplary end of day operations initiated by an institution may involve wire operations, triggering scheduled jobs, Federal Reserve Bank transactions or communications, and/or executing application shutdown and maintenance computer programs.

With general reference to FIGS. 3 through 7, various tabular representations are shown as exemplary portions of the calendar control module 106 as configured in accordance with embodiments of the invention. In can be appreciated that these examples are provided merely to illustrate various operational aspects of the invention for those skilled in the art. No particular aspect or aspects of these calendar control module 106 portions (e.g., format, specific command language, etc.) are necessarily intended to limit the scope of the invention.

Figure 3:
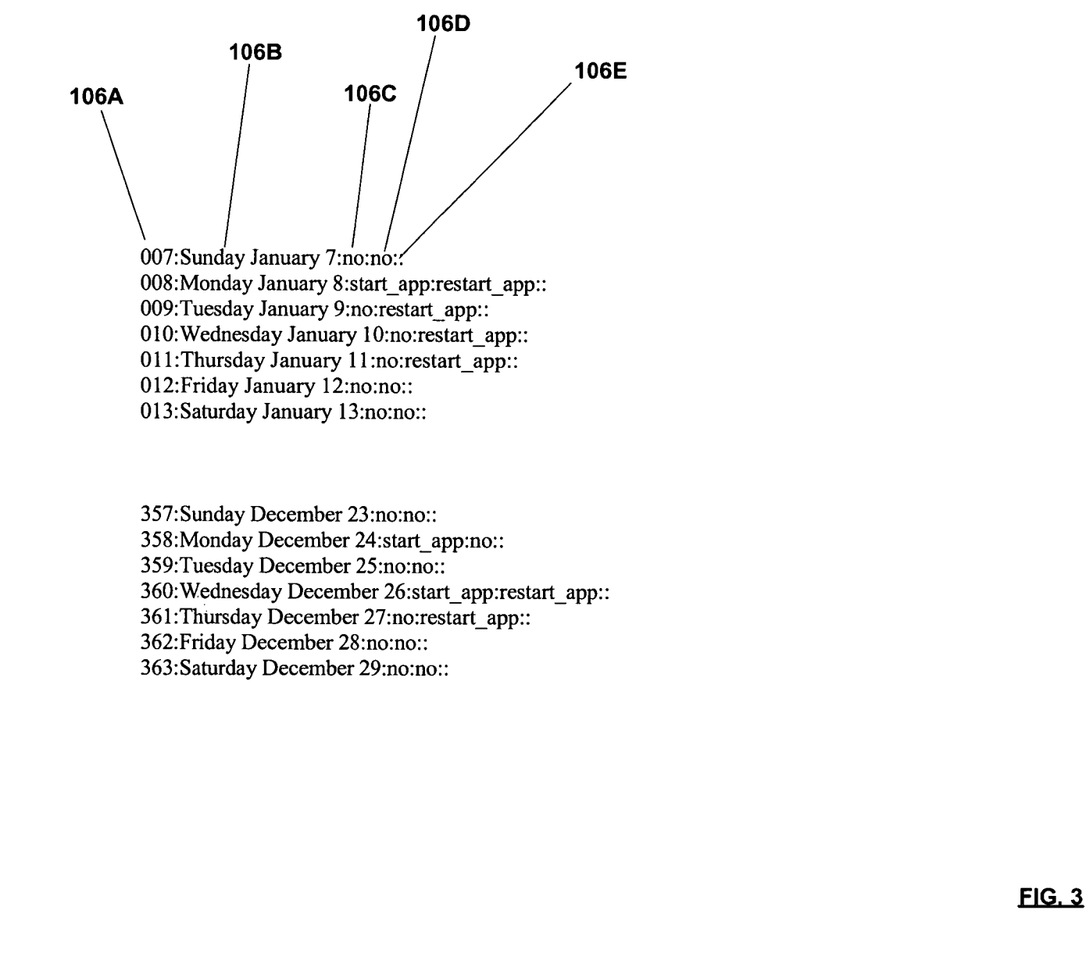
FIGS. 3 through 7 include tabular representations of examples of portions of a calendar control module configured in accordance with embodiments of the invention.

Referring to FIG. 3, examples of various start options for the application 104 are illustrated. At 3:00 a.m. every calendar day throughout a calendar year, a scheduled job is executed by the processor 102 to determine the Julian calendar day of the year and to read the start command field 106C in the calendar control module 106. In this example, there are several possible actions: do not start the application 104; start the application 104 following a non-business day; start the application 104 on a Monday holiday; or, recover the application 104 on a Monday following a Friday holiday. If the field 106C is read and contains "no" then the application 104 is not started and the scheduled job exits. If the field 106C is read and contains "start_app" then the application 104 is started on the "today" business date in normal mode 204C. If the field 106C is read and contains "holiday" then the business date indicator field 106E is also read; the date contained in field 106E application 104 is used as the business date on which to start the application 104, which is the next non-holiday business day.

As shown in FIG. 3, on Julian days 007 and 357, the 3:00 a.m. scheduled job executes, finds "no" in field 106C. The application 104 is consequently not started, and the scheduled job exits. On Julian days 008, 358 and 360, the 3:00 a.m. scheduled job executes and finds "start_app" in field 106C. The application 104 is consequently started on that business date in normal mode 204C. On the remaining days, the 3:00 a.m. process repeats and checks to see if the application 104 should be started. Field 106C is "no" for the remainder of the week, however, and the scheduled jobs exits each day without starting the application 104.

Figure 4:
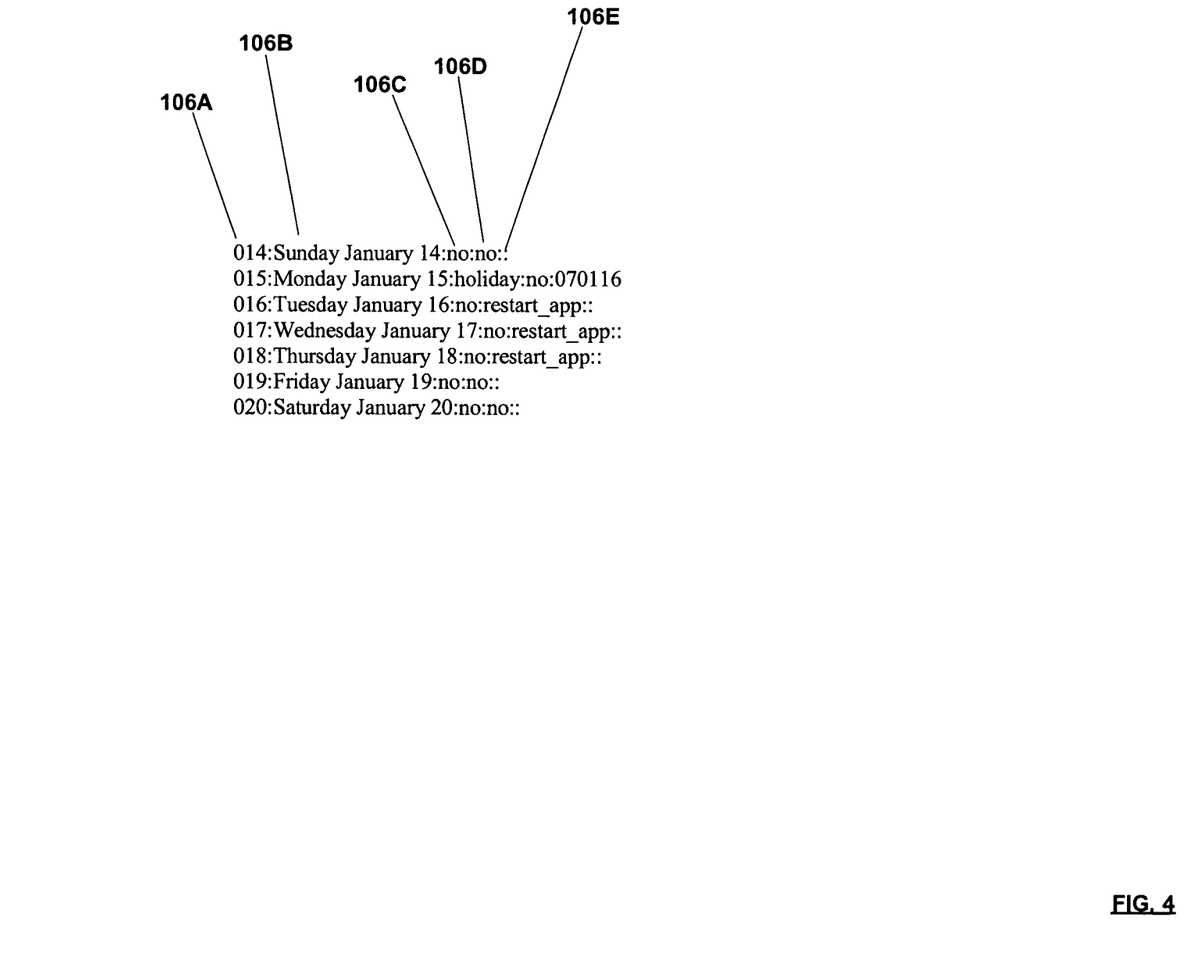

With regard to FIG. 4, an example of starting the application 104 on a Monday holiday is illustrated. If a banking institution, for example, is open for business on a holiday, then the specified business date in the business date indicator field 106E is the date of the next non-holiday business day. The processor 102 causes the scheduled job to read the calendar control module 106, and if either of the command fields 106C, 106D is designated as "holiday", then the business date indicator field 106E is read, and the application 104 can be started on the business date specified therein. In the example shown, on Julian day 014, the 3:00 a.m. scheduled job executes and finds "no" in field 106C. Consequently, the application 104 is not started, and the processor 102 causes the scheduled job to exit. On Julian day 015, the 3:00 a.m. scheduled job executes and finds "holiday" in field 106C. The scheduled job then refers to field 106E, determines the business date to be "070116" (which represents Tuesday, Jan. 16, 2007) and starts the application 104 using this business date. The application 104 is started in holiday mode 204D, a subset of the full set of processes which would execute in normal mode 204C. The remainder of the processes not started in holiday mode 204D may be subsequently scheduled to start at 3:00 a.m. of the next non-holiday business day. In this example, with respect to a Monday holiday, the remaining processes are scheduled to start at 3:00 a.m. on Tuesday, Jan. 16, 2007, thus making the application 104 fully functional on the next full business day, or Tuesday, Jan. 16, 2007. On the remaining days, Wednesday, Jan. 17, 2007, through Saturday, Jan. 20, 2007, the 3:00 a.m. process repeats and checks to see if the application 104 should be started. As shown in FIG. 4, field 106C is "no" for the remainder of week and the scheduled jobs exits each day without starting the application 104.

In another example, a financial institution at the end of a business day, may have a bank operations staff that executes end-of-day procedures to initiate the close of the business day. Following such end-of-day procedures, the processor 102 may be configured to execute a scheduled job that determines the current Julian day, refers to the calendar control module 106, and reads the restart command field 106D to determine the appropriate "restart" action. There are at least three possible actions: do not restart the application 104; restart the application 104 for the next business day (e.g., in view of a holiday); or, restart the application 104 on the business date of the next non-holiday business day, wherein there may be at least two holiday restart scenarios: a first scenario for Tuesday, Wednesday, and Thursday holidays, and a second scenario for a Friday holiday. If the field 106D includes "no" then the application 104 is not restarted and the scheduled job exits. If the field 106D includes "restart_app" then the application 104 restarts on the next business date in normal mode 204C.

With respect to restarting the application on a Tuesday, Wednesday, or Thursday holiday, if the field 106D reads "holiday", then the business date indicator field 106E is checked to retrieve the business date on which to restart the application 104. The date retrieved from the field 106E may be the next non-holiday business day. With respect to restarting the application 104 on a Friday holiday, if the field 106D reads "holiday", then the business date indicator field 106E is checked to retrieve the business date on which to restart the application 104. The business date retrieved from the field 106E may be a non-holiday business day which is a Monday. In this event, the processor 102 may instruct the application 104 to shut down for the weekend and schedule a recovery operation for the next following business date on Monday.

Figure 5:
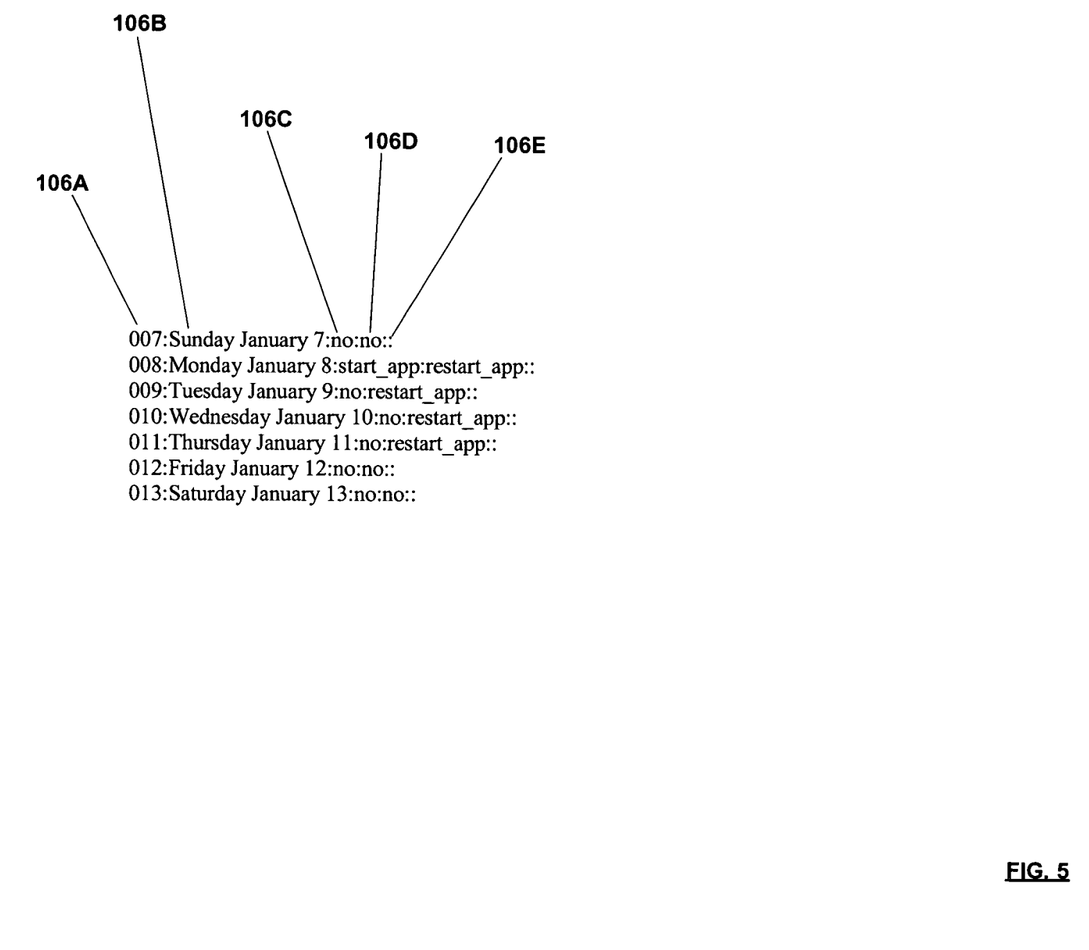

With regard to FIG. 5, an example of restarting the application 104 for the next business day is illustrated. If the restart command field is read as "restart_app", then the application 104 starts on the next business date in normal mode 204C. In the example shown, the application 104 will restart itself on the next business day. On Julian day 008, the business date is set to Tuesday, Jan. 9, 2007. On Julian day 009, the business date is set to Wednesday, Jan. 10, 2007, and the pattern of setting the business date to the next business date repeats until Julian day 012 when the field 106D value is "no" and the application 104 is not restarted.

Figure 6:
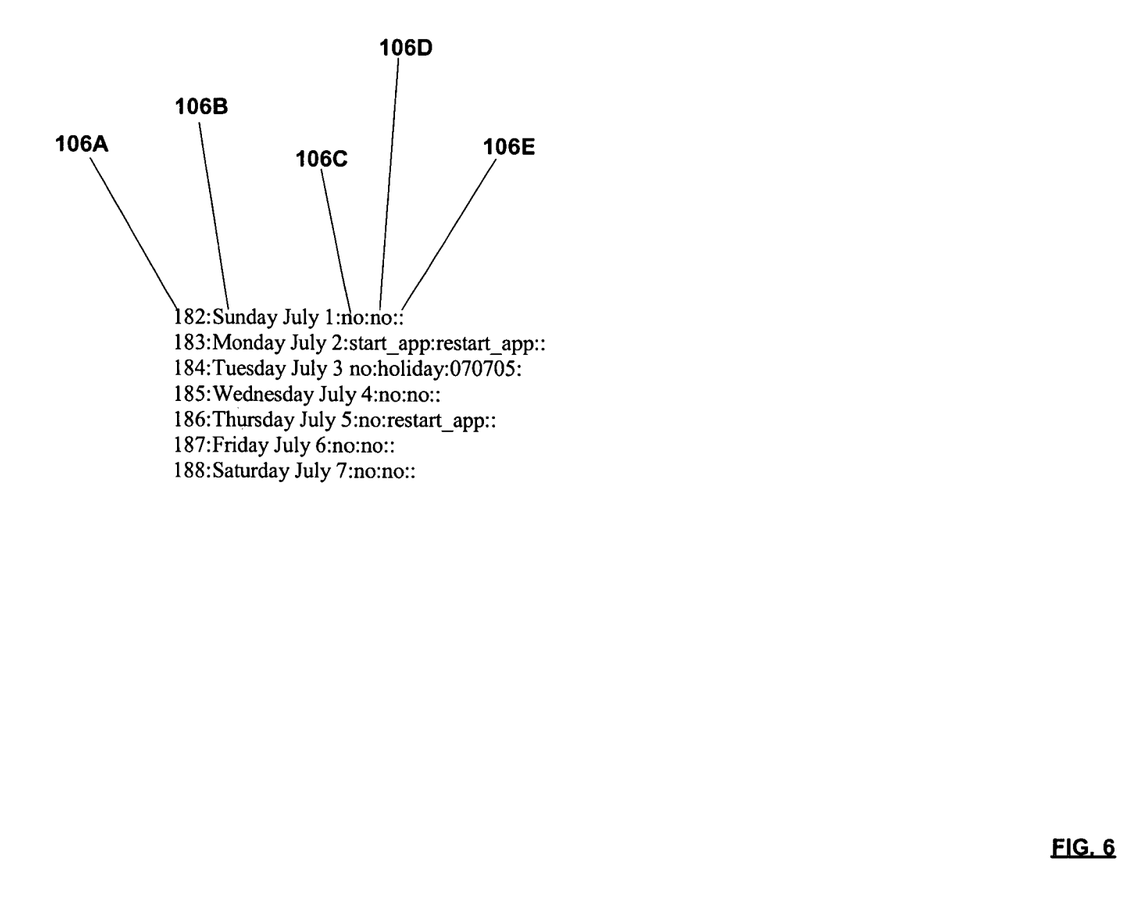

With regard to FIG. 6, an example is shown in which the scheduled week for operation of the application 104 has a Tuesday, Wednesday, or Thursday holiday. As noted above, when the field 106D contains "holiday" on a Tuesday, Wednesday, or Thursday, then field 106E is checked to determine the business date to use to restart the application 104. In this example, on Tuesday, July 3, Julian day 184, following the end-of day procedure initiation, the processor 102 determines the current Julian day, refers to the calendar control module 106, reads field 106D and determines the restart action to be "holiday". The processor 102 then refers to field 106E and determines the business date to be "070705" (which represents "Thursday, Jul. 5, 2007) and restarts the application 104 using this business date. The application 104 restarts in holiday mode 204D, which may be a subset of the full set of processes which would execute in normal mode 204C. The remainder of the processes not started in holiday mode 204D can be subsequently scheduled to start at 3:00 a.m. of the next non-holiday business day. In this example, for the Tuesday holiday, the remaining processes are scheduled to start at 3:00 a.m. on Thursday, Jul. 5, 2007. This makes the application fully functional on the next full business day, or on Thursday, Jul. 5, 2007. It can be seen that this scenario differs from a Monday holiday situation wherein the application 104 is scheduled to return to full functionality at 3:00 a.m. of the next calendar day. For Tuesday, Wednesday, and Thursday holidays, the return to full functionality may not occur at 3:00 a.m. of the next day calendar day; instead, the application 104 returns to full functionality two days forward. In other words, for a Tuesday holiday, the return to full functionality occurs Thursday at 3:00 a.m. Similarly, the return to full functionality for a Tuesday holiday, where the Wednesday business date was set at the end of Monday's business day, may occur on Wednesday at 3:00 a.m. Similarly for a Thursday holiday, the Friday date can be set at the end of Tuesday's business day, and the return to full functionality for the application may occur Friday at 3:00 a.m.

Figure 7:
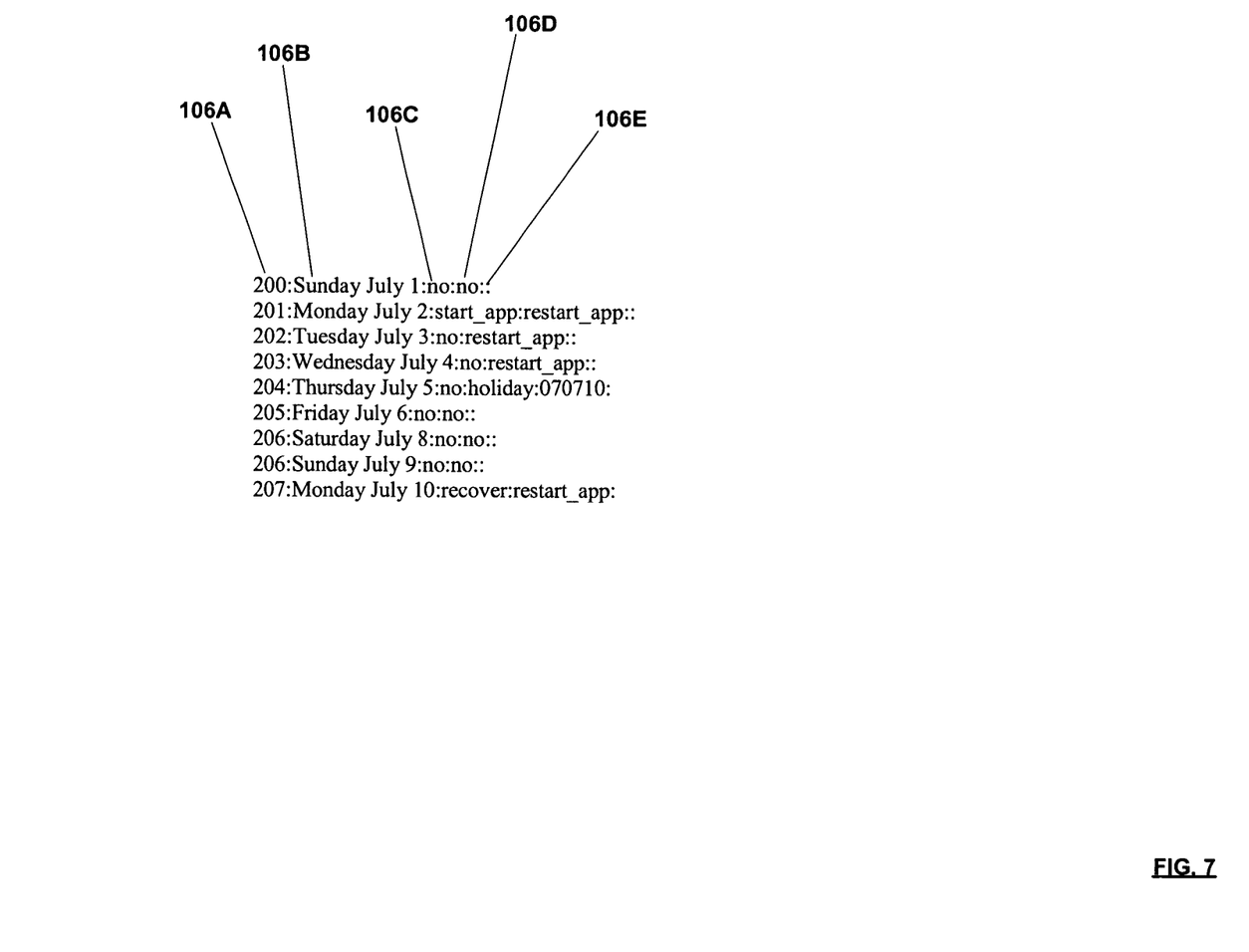

With regard to FIG. 7, an example is shown in which the scheduled week for operation of the application 104 has a Friday holiday. When field 106D contains "holiday" on a Thursday, the processor 102 checks field 106E to determine the business date to be used to restart the application 104. In this example, the business date may be the next non-holiday business date, or the following Monday. As shown, on Thursday, Jul. 5, 2007, Julian day 204, following the end-of day procedure initiation, the processor 102 determines the current Julian day, refers to the calendar control module 106, and reads field 106D to determine the restart action and finds "holiday" (note: for purposes of convenience of disclosure, the present example assumes that Friday, Jul. 6, 2007 is a holiday). The processor 102 then reads field 106E and determines the business date to be "070710" (which represents Monday, Jul. 10, 2007) and plans to restart the application 104 using this business date. The application 104 restarts in holiday mode 204D, a subset of the full set of processes which would execute in normal mode 204C. It can be seen that Friday holidays differentiate themselves from Monday through Thursday holidays in that the remainder of the processes not started in holiday mode 204D may not be subsequently scheduled to start at 3:00 a.m. of the next non-holiday business day, and an application 104 shutdown may be scheduled for 4:00 p.m. on Friday to close the application 104 for the weekend while still maintaining Monday's business date. On Monday at 3:00 a.m., the application 104 can be recovered to full functionality for Monday's business day.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these sorts of focused discussions would not facilitate a better understanding of the present invention, and therefore, a more detailed description of such elements is not provided herein.

Any element expressed herein as a means for performing a specified function is intended to encompass any way of performing that function including, for example, a combination of elements that performs that function. Furthermore the invention, as may be defined by such means-plus-function claims, resides in the fact that the functionalities provided by the various recited means are combined and brought together in a manner as defined by the appended claims. Therefore, any means that can provide such functionalities may be considered equivalents to the means shown herein.

In general, it will be apparent to one of ordinary skill in the art that various embodiments described herein, or components or parts thereof, may be implemented in many different embodiments of software, firmware, and/or hardware. The software code or specialized control hardware used to implement some of the present embodiments is not limiting of the present invention. For example, the embodiments described hereinabove may be implemented in computer software using any suitable computer software language type such as, for example, C or C++ using, for example, conventional or object-oriented techniques. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present invention based on the description herein with only a reasonable effort and without undue experimentation.

Moreover, the processes associated with the present embodiments may be executed by programmable equipment, such as computers. Software or other sets of instructions that may be employed to cause programmable equipment to execute the processes may be stored in any storage device, such as, for example, a computer system (nonvolatile) memory, an optical disk, magnetic tape, or magnetic disk. Furthermore, some of the processes may be programmed when the computer system is manufactured or via a computer-readable medium. Such a medium may include any of the forms listed above with respect to storage devices and may further include, for example, a carrier wave modulated, or otherwise manipulated, to convey instructions that may be read, demodulated/decoded and executed by a computer.

It can also be appreciated that certain process aspects described herein may be performed using instructions stored on a computer-readable medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary.

A computer-readable medium may further involve one or more data signals transmitted on one or more carrier waves.

A "computer" or "computer system" may be, for example, a wireless or wire line variety of a microcomputer, minicomputer, server, mainframe, laptop, personal data assistant (PDA), wireless e-mail device (e.g., "BlackBerry" trade-designated devices), phone, smart phone, cellular phone, cable box, pager, processor, fax machine, scanner, or any programmable device configured to transmit and receive data over a network. Computer devices disclosed herein may include memory for storing certain software applications used in obtaining, processing and communicating data. It can be appreciated that such memory may be internal or external to the disclosed embodiments. The memory may also include any means for storing software, including a hard disk, an optical disk, floppy disk, ROM (read only memory), RAM (random access memory), PROM (programmable ROM), EEPROM (electrically erasable PROM), and other computer-readable media.

In various embodiments of the present invention disclosed herein, a single component may be replaced by multiple components, and multiple components may be replaced by a single component, to perform a given function or functions. Except where such substitution would not be operative to practice embodiments of the present invention, such substitution is within the scope of the present invention.

While various embodiments of the invention have been described herein, it should be apparent, however, that various modifications, alterations and adaptations to those embodiments may occur to persons skilled in the art with the attainment of some or all of the advantages of the present invention. The disclosed embodiments are therefore intended to include all such modifications, alterations and adaptations without departing from the scope and spirit of the present invention as set forth in the appended claims.

What is claimed is:

1. In an open system computing environment having at least one processor operatively associated with a non-volatile storage medium, a method for executing a computer-implemented business date driven application, the method comprising:

accessing, via the at least one processor and with a business date driven application, a calendar control module to determine an operational mode of the business date driven application, wherein:
the business date driven application is configured to execute calendar based actions, functions, tasks, and/or operations for any one or combination of a financial application, a banking system, a computer-based task or job scheduling application, and inventory control applications;
the operational mode comprises a normal operational mode, and a holiday operational mode;
the calendar control module is based at least in part on a Julian calendar;
the holiday operational mode has less functionality available for the business date driven application than the normal operational mode of the business date driven application;
the holiday operational mode includes a subset of normal operational mode functions, wherein the holiday operational mode provides partial functionality with a scheduled return to full functionality of the normal operational mode on a future business day, the partial functionality including limiting or not performing functions of archiving or erasing transaction history records;
the holiday operational mode limits communication exchanging functions to accommodate operating at a reduced bandwidth;

accessing, via the at least one processor, data from at least one of the following data fields of the calendar control module:
(i) a Julian calendar day of year field,
(ii) an application start command field,
(iii) an application restart command field, and
(iv) a business date indicator field;

automatically executing, via the at least one processor, the business date driven application in accordance with the operational mode selected from the normal operational mode and the holiday operational mode and based on the accessed data fields of the calendar control module to discriminate between business dates and nonbusiness dates and extend availability of the business date driven application;

determining, via the at least one processor, at least one of whether a business day is a correct business day for a specific calendar day of a year, a next appropriate business day for the business date driven application to operate if a current day is a holiday, whether to start the business date driven application on a new business day following a non-business day, when to shut down the business date driven application if a next day is not the business day, and when to not start the business data driven application if the current day is not the business day, wherein the correct business day is repeatedly re-defined; and processing, via the at least one processor, at least one calendar based action in connection with automatically executing the business date driven application;

wherein the business date driven application is configured to execute at least one calendar based action on the specific calendar day so as to avoid manual initiation of an operational mode.

2. The method of claim 1, wherein at least part of communication connections exchanging information with the application is disabled in the holiday mode.

3. The method of claim 1, further comprising if the application start command field includes an indication of a holiday, then accessing the business date indicator field to determine a date for executing the determined operational mode of the application.

4. The method of claim 1, further comprising if the application restart command field includes an indication of a holiday, then accessing the business date indicator field to determine a date for executing the determined operational mode of the application.

5. The method of claim 1, further comprising if the application start command field or the application restart command field includes an indication of a recover operational mode for the application, then executing a recover operation for the application.

6. The method of claim 1, wherein the application start command field includes a start command.

7. The method of claim 1, wherein the application restart command field includes a restart command.

8. The method of claim 1, wherein both the application start command field and the application restart command field include a negative indication with respect to executing the business date drive application.

9. The method of claim 1, wherein at least one of the application start command field or the application restart command field includes a start command or a restart command.

10. The method of claim 1, wherein the calendar control file includes at least one full calendar year of data for each of the fields in the calendar control module.

11. A system configured to operate in an open system computing environment, the system comprising:
   a processor programmed with instructions for executing a computer-implemented business date driven application in an open system computing environment, wherein the business date driven application is configured to execute calendar based actions, functions, tasks, and/or operations for any one or combination of a financial application, a banking system, a computer-based task or job scheduling application, and inventory control applications;
   a calendar control module executed by the processor, the calendar control module being configured for access by the business data driven application for determining an operational mode of the application, wherein the operational mode is selected from a plurality of operational modes comprising normal operational mode, startup operational mode, restart operational mode, and holiday operational mode, wherein the holiday operational mode has less functionality available for the business date driven application than the normal operational mode of the business date driven application, wherein the holiday operational mode includes a subset of normal operational mode functions, wherein the holiday operational mode provides partial functionality with a scheduled return to full functionality of the normal operational mode on a future business day, the partial functionality including limiting or not performing functions of archiving or erasing transaction history records, wherein the holiday operational mode limits communication exchanging functions to accommodate operating at a reduced bandwidth, and wherein the calendar control module is based at least in part on a Julian calendar, the calendar control module including at least the following data:
      (i) a Julian calendar day of year field,
      (ii) an application start command field,
      (iii) an application restart command field, and
      (iv) a business date indicator field;
   the processor being programmed for accessing data from at least one of the data fields of the calendar control module;
   the processor being programmed for automatically executing the business date driven application in accordance with the operational mode selected from the plurality of operational modes and based on the accessed data fields of the calendar control module to discriminate between business dates and nonbusiness dates and to extend availability of the business date driven application;
   the processor being programmed for determining at least one of whether a business day is a correct business day for a specific calendar day of a year, a next appropriate business day for the business date driven application to operate if a current day is a holiday, whether to start the business date driven application on a new business day following a non-business day, when to shut down the business date driven application if a next day is not the business day, and when to not start the business data driven application if the current day is not the business day, wherein the correct business day is repeatedly re-defined; and
   the processor being programmed for processing at least one calendar based action in connection with automatically executing the business date driven application;
   wherein the business date driven application is configured to execute at least one calendar based action on the specific calendar day so as to avoid manual initiation of an operational mode.

12. A non-transitory computer-readable medium including instructions for causing a programmable apparatus to perform a method for executing a computer-implemented business date driven application in an open system computing environment, the method comprising:
   accessing, with a business date driven application configured for operation in an open system computing environment, a calendar control module to determine an operational mode of the application, wherein:
      the business date driven application is configured to execute calendar based actions, functions, tasks, and/or operations for any one or combination of a financial application, a banking system, a computer-based task or job scheduling application, and inventory control applications;
      the operational mode is selected from a plurality of operational modes comprising normal operational mode, startup operational mode, restart operational mode, and holiday operational mode;
      the holiday operational mode has less functionality available for the business date driven application than the normal operational mode of the business date driven application;
      the holiday operational mode includes a subset of normal operational mode functions, wherein the holiday operational mode provides partial functionality with a scheduled return to full functionality of the normal operational mode on a future business day, the partial functionality including limiting or not performing functions of archiving or erasing transaction history records;
      the holiday operational mode limits communication exchanging functions to accommodate operating at a reduced bandwidth;
      the calendar control module is based at least in part on a Julian calendar;
   accessing data from at least one of the following data fields of the calendar control module:
      (i) a Julian calendar day of year field,
      (ii) an application start command field,
      (iii) an application restart command field, and
      (iv) a business date indicator field;
   automatically executing the application in accordance with the operational mode selected from the plurality of operational modes and based on the accessed data fields of the calendar control module to discriminate between business dates and nonbusiness dates and to extend availability of the business date driven application;
   determining at least one of whether a business day is a correct business day for a specific calendar day of a year, a next appropriate business day for the business date driven application to operate if a current day is a holiday, whether to start the business date driven application on a new business day following a non-business day, when to shut down the business date driven application if a next day is not the business day, and when to not start the business data driven application if the current day is not the business day, wherein the correct business day is repeatedly re-defined; and processing at least one calendar based action in connection with automatically executing the business date driven application;
wherein the business date driven application is configured to execute at least one calendar based action on the specific calendar day so as to avoid manual initiation of an operational mode.

\* \* \* \* \*